INVENTOR.
GERRIT KOOL
BY
Frank R. Trifari
AGENT

Dec. 27, 1966 G. KOOL 3,294,900

CIRCUIT FOR HUE CONTROL IN A COLOR TELEVISION RECEIVER

Filed Nov. 27, 1963 2 Sheets-Sheet 2

INVENTOR
GERRIT KOOL

BY

Frank R. Trifari

AGENT

United States Patent Office 3,294,900

Patented Dec. 27, 1966

3,294,900

CIRCUIT FOR HUE CONTROL IN A COLOR TELEVISION RECEIVER

Gerrit Kool, Emmasingel, Eindhoven, Netherlands, assignor to North American Philips Company, Inc., New York, N.Y., a corporation of Delaware Filed Nov. 27, 1963, Ser. No. 326,469
Claims priority, application Netherlands, Nov. 29, 1962, 286,152; Sept. 9, 1963, 297,671
16 Claims. (Cl. 178—5.4)

The invention relates to a circuit arrangement for use in a color television receiver for a color television system in which two color signals are modulated in quadrature on a subcarrier and the burst signal is simultaneously emitted as a separate synchronizing signal during a porch between two lines. The arrangement comprises a first synchronous demodulator, which may be followed by a matrix circuit for obtaining finally, subsequent to demodulation, those color signals which are modulated on the subcarrier prior to demodulation in a direction which is in quadrature relative to the phase with which the burst signal is transmitted. Said color signals are applied to a first comparison stage which becomes operative between each pair of lines. The output voltage of this comparison stage is applied for control-purposes, to a local oscillator in which the subcarrier is regenerated. The subcarrier is supplied to the said synchronous demodulator. The arrangement also comprises a second synchronous demodulator to which the regenerated subcarrier is also supplied, but in a phase differing from that with which the regenerated subcarrier is fed to the first synchronous demodulator. The second demodulator is followed, as the case may be, by a matrix circuit for obtaining finally, subsequent to demodulation, those color signals which are modulated, prior to demodulation, on the subcarrier in quadrature relative to the first-mentioned color signals.

Such an arrangement has the advantage that no separate phase detector is required, since the function of a phase detector is served by the first synchronous demodulator. A comparison stage is required, however, in order to obtain the final control-voltage for the local oscillator by which the subcarrier is regenerated in the receiver. A keyed amplifying stage for amplifying the burst signal is not necessary.

According to the invention this arrangement can be further improved by using, in addition, the output signal of the second synchronous demodulator for further control purposes, particularly for hue control of the image reproduced by means of the color signals obtained from the synchronous demodulators.

According to the invention a signal is derived from the second synchronous demodulator and is applied to a second comparison stage, which also becomes operative only between two lines. The output voltage of the second comprising stage is applied to a potentiometer arrangement, by means of which the bias voltage for the first-mentioned comparison stage can be adjusted and hence the hue control of the color picture to be reproduced.

The first advantage of the arrangement according to the invention is that, when a phase difference is adjusted between the signal produced by the local oscillator and the burst signal, this phase difference is independent of the amplitude of the burst signal. A second advantage is that, when by means of the potentiometer circuit for the hue control a phase difference has been intentionally adjusted between the burst signal the regenerated subcarrier, this phase difference vanishes as soon as the whole arrangement gets out of synchronization. Since this adjusted phase difference disappears, the phase control regains its catching range in a symmetrical manner, while the maximum catching range is maintained in spite of the fact that due to the hue control a phase difference is adjusted in the synchronization state.

A few possible embodiments of the arrangement according to the invention will now be described by way of example with reference to the figures of the accompanying drawing, in which.

Figure 1:
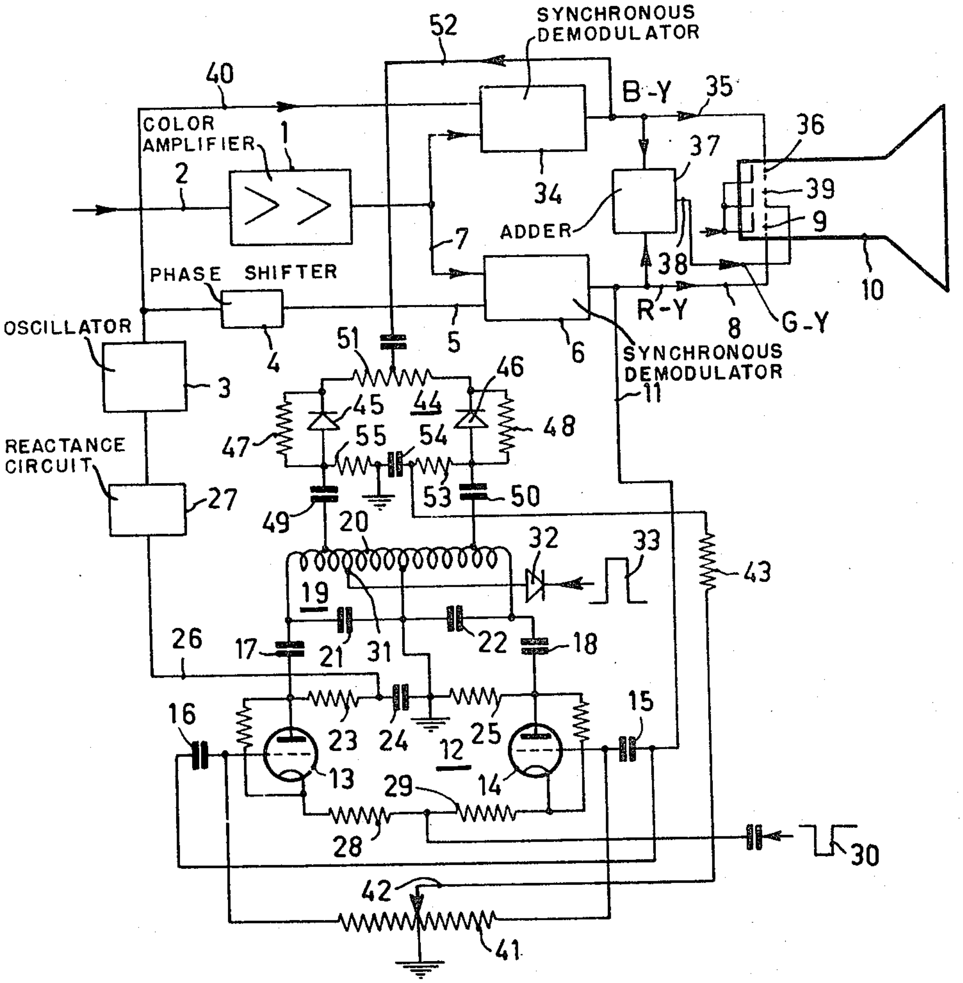
FIG. 1 shows a first embodiment.

In FIGURE 1 reference numeral 1 designates a color amplifier, to the input terminal 2 of which are fed the color signals modulated in quadrature on the subcarrier. When the color signal is composed in accordance with the N.T.S.C. system (National Television System Committee) of the United States, this signal may be indicated by the Equation 1:

$$\alpha(R-Y)\cos\omega t+\beta(B-Y)\sin\omega t-P\sin\omega t \quad (1)$$

wherein $R-Y$ designates the red color difference signal and $B-Y$ the blue color difference signal, and $\alpha$ and $\beta$ are coefficients indicating to what extent the red and blue color difference signals are modulated on the subcarrier with the angular frequency $\omega$. The factor $-P\sin\omega t$ indicates the burst signal transmitted on the porches, by means of which the local oscillator 3 must be synchronized.

This may be performed as follows. It is assumed that the oscillator 3 produces a signal of the form:

$$\sin(\omega t+\varphi) \quad (2)$$

In the Equation 2 $\varphi$ designates the phase angle between the regenerated subcarrier signal regenerated in the oscillator 3 and the burst signal. This phase angle $\varphi$ may be due inter alia to aging of the synchronizing circuits in the receiver, to aging of the local oscillator or to alterations of the supply voltage of the receiver. The phase angle $\varphi$ may furthermore be due to a variation in the frequency of the burst signal at the transmitter. The signal obtained from the local oscillator is shifted in phase through about 90° in the phase shifting network 4, so that the output of the network 4 delivers a signal indicated by the Equation 3:

$$\cos(\omega t+\varphi) \quad (3)$$

This signal is fed via the conductor 5 to the first synchronous demodulator 6, to which is also fed, via the conductor 7, the signal indicated by the Equation 1. Therefore the output of the demodulator 6 delivers the signal indicated by the equation 4:

$$K_1\left\{\alpha\frac{(R-Y)}{2}\cos\varphi-\beta\frac{(B-Y)}{2}\sin\varphi+\frac{1}{2}P\sin\varphi\right\} \quad (4)$$

wherein $K_1$ is a constant determined by the demodulator 6. From the Equation 4 it appears that, when the phase angle $\varphi$ is equal to zero, only the term $$\alpha\frac{(R-Y)}{2}$$

remains, which means that the undesirable color difference term $(B-Y)$ disappears, and no control-voltage is required, since the subcarrier produced by the local oscillator 3 is completely in phase with the burst signal.

However, if $\varphi$ is not equal to zero, there must be a possibility of control. This is provided in the arrangement by supplying the output signal of the synchronous demodulator 6 via the conductor 8 not only to a control-grid 9 of the red gun of the display tube 10 but also via a conductor 11 to a first comparison stage 12. This comparison stage comprises two triodes 13 and 14, to the control-grids of which is fed the output signal of the synchronous demodulator 6 via the capacitors 15 and 16.

As stated above, the term P sin $\omega t$ only occurs during the back porches between two lines. Therefore, the signal $\frac{1}{2}P$ sin $\varphi$ of the Equation 4 will only occur triodes 13 and 14 are keyed so that they are in the conducting state during the said back porches, only the term $\frac{1}{2}P$ sin $\varphi$ can have an influence on the control-signal obtained from the comparison stage 12. This is achieved by coupling the anodes of the triodes 13 and 14 via capacitors 17 and 18 with an oscillatory circuit 19. The oscillatory circuit 19 comprises an inductor 20 and capacitors 21 and 22. A central tapping of the inductor 20 is connected to the junction of the capacitors 21 and 22, and this junction is connected to ground. The anodes of the triodes 13 and 14 are also connected to each other via the series combination of a resistor 23, a capacitor 24 and a resistor 25. The junction of the capacitor 24 and the resistor 25 is also connected to ground and the output voltage is fed via the conductor 26 to the reactance circuit 27, by means of which the oscillator 3 can be readjusted.

Finally, the cathodes of the triodes 13 and 14 are connected to each other via resistors 28 and 29. To the junction of the resistors 28 and 29 are fed negative-going line fly-back pulses, which are derived from the horizontal deflection circuit of the receiver. The pulses 30 thus provide the supply voltage for the two triodes during the line fly-back time. With the aid of the line fly-back pulses 30 the triodes 13 and 14 are made conducting during the line fly-back time.

A tapping 31 of the inductor 20 has furthermore connected to it the anode of a diode 32. Positive line fly-back pulses 33 are applied to the cathode of diode 32. The pulses 33 render the diode 32 conducting during a line, so that the oscillatory circuit 19 is strongly damped and can therefore not oscillate during the periods. During a positive pulse 33 the diode 32 is blocked and the oscillatory circuit 19 can freely oscillate. The oscillatory circuit is tuned to a harmonic of the line fly-back frequency, for example to the second harmonic thereof.

Since the line fly-back time comprises both the line synchronization pulse and the back porch with the transmitted burst signal, both the anode of the triode 13 and the anode of the triode 14 will receive a positive pulse from said oscillatory circuit during one period thereof, so that it is possible to compare the black level with the amplitude determined by the term $\frac{1}{2}P$ sin $\varphi$ in the valves 13 and 14, since the line synchronizing pulses are filtered out in the filter of the amplifier 1, so that the signal fed to the control-grids of the comparison stage 12 during the line synchronizing pulses corresponds to the black level. If the phase angle $\varphi$ is positive, the term $\frac{1}{2}P$ sin $\varphi$ will also be positive and hence the signal produced across the conductor 26 will have such a polarity that, in co-operation with the reactance circuit 27, the oscillator 3 is readjusted so that the angle $\varphi$ is at a minimum. If, on the contrary, the angle $\varphi$ is negative, a voltage of opposite polarity will be produced across the conductor 26 and the angle $\varphi$ will also be readjusted to a minimum value. This is due to the fact that by a change-over of the polarity of the angle $\varphi$, the polarity of the term $\frac{1}{2}P$ sin $\varphi$ is also inverted, and because in regard to the position of the phase of the burst signal, the $R-Y$ demodulator 6 also serves as a phase detector for the synchronization of the oscillator 3.

In the second synchronous demodulator 34 the second color difference signal $B-Y$ is produced. This signal is fed via a conductor 35 to the control-grid 36 of the display tube 10. The signals obtained from the two demodulators 6 and 34 and added in adding circuit 37 so that the output 38 of the adding circuit 37 delivers the green color difference signal $G-Y$, which is fed to the control-grid 39. By supplying the brightness signal Y in known manner to the three cathodes of the tube 10, the three guns of the display tube 10 are capable of reproducing a color picture on the screen by means of said signals.

However, it is desirable for the user of the receiver to be able to readjust the hue of the reproduced picture. This can be carried out in a simple manner by adjusting intentionally the phase angle $\varphi$ to a value differing from zero.

The output signal of the oscillator 3, indicated by the Equation 2 is fed via a conductor 40 to the second synchronous demodulator 34. Therefore, the output signal of the demodulator 34 may be indicated by the Equation 5:

$$K_2\left\{\frac{\alpha(R-Y)}{2}\sin\varphi+\frac{\beta(B-Y)}{2}\cdot\cos\varphi-\frac{1}{2}P\cos\varphi\right\} \quad (5)$$

wherein $K_2$ is a constant determined by the demodulator 34.

When an angle $\varphi$ deviating from zero is intentionally adjusted with the aid of the hue control-circuit, it follows from the Equation 4 that the demodulator 6 delivers not only the desired color difference term $R-Y$ but also a color difference term $B-Y$, which means that color signals are added so that the color desired by the user of the apparatus is reproduced. From the Equation 5 it will be seen that with a phase angle $\varphi$ deviating from zero not only the desired color difference signal $B-Y$ but also a term with the color difference signal $R-Y$ is added, so that also in this manner the desired hue can be adjusted. This depends only upon the chosen phase angle $\varphi$. In accordance with the invention the phase angle $\varphi$ is adjusted by means of the potentiometer circuit comprising the resistor 41. A central tapping of this resistor is connected to ground and the two ends of said resistor are connected to the control-grids of the triodes 13 and 14. A variable tapping 42 of the resistor 41 is connected via a further resistor 43 to a second comparison stage 44. The second comparison stage comprises diodes 45 and 46, shunted by resistors 47 and 48. The anodes of the diodes 45 and 46 are connected via capacitors 49 and 50 to tappings of the inductor 20. The cathodes of the diodes 45 and 46 are connected to each other via a resistor 51. A tapping of the resistor 51 is connected via a conductor 52 to an output terminal of the second synchronous demodulator 34. Owing to the coupling of the anodes of the diodes 45 and 46 with the tappings of the inductor 20 these diodes 45 and 46 are only conducting during the line fly-back pulses, so that the comparison stage 44 will deliver an output signal, which is proportional to the term $-\frac{1}{2}P$ cos $\varphi$ of the Equation 5. The resistor 53, which forms parts of the series combination of a capacitor 54 and a resistor 55, constitutes together with the capacitor 54 a smoothing filter which smoothes the negative voltage produced in the comparison stage 44. This negative voltage is fed via the resistor 43 to the variable tapping 42 and is directly proportional to the term $\frac{1}{2}P$ cos $\varphi$.

If $\varphi$ is equal to zero, cos $\varphi$ is equal to 1 and the voltage fed via the resistor 43 is at a maximum. If the angle $\varphi$ assumes a value deviating from zero, in which case it is immaterial whether this excursion is negative or positive, the value of the term $\frac{1}{2}$P cos $\varphi$ always decreases and hence the negative voltage supplied via the resistor 43 also decreases. If the tapping 42 is located just above the grounded tapping of the resistor 41, no negative voltage will be fed to the control-grids of the triodes 13 and 14 and the comparison stage 12 will operate as well as possible in symmetry. If, on the contrary, the tapping 42 is shifted to the right, the control-grid of the valve 14 will receive a negative voltage and the comparison stage 12 will no longer be adjusted in symmetry. This results in a phase angle $\varphi$ deviating from zero being produced with a given polarity. If, on the contrary, the tapping 42 is shifted to the left, the control-grid of the valve 13 will receive a negative bias voltage and the symmetry is again disturbed, but with the opposite polarity, so that again a phase angle $\varphi$ deviating from zero is obtained, its polarity being, however, opposite that in the case in which the tapping 42 is shifted to the right. This means that by displacing the tapping 42 to the right or to the left any desired phase angle $\varphi$ can be provided and it will thus be apparent that any desired hue of the picture to be produced can be acquired.

As stated above, the negative voltage supplied via the tap 42 varies as $-\frac{1}{2}P \cos \varphi$. In fact, the voltage applied via this route to the comparison stage 12 may be written as $\pm\frac{1}{2}P1/x \cos \varphi$, the sign which is to be taken and the value of $x$ depending on which side of, and by how much, the tap 42 is set relative to the grounded point of potentiometer 41 (neglecting any further amplification in the circuit). The total effective voltage applied to stage 12 is therefore $\frac{1}{2}P \sin \varphi \pm \frac{1}{2}P1/x \cos \varphi = \frac{1}{2}P (\sin \varphi \pm 1/x \cos \varphi)$, and this may consequently be considered to be the voltage $V_r$ applied to reactance circuit 27. Now the complete circuit is a regulating circuit, which tries to make $V_r$ as small as possible and in the ideal case (which is never quite achieved in practice) the circuit will reach equilibrium with $V_r=0$. Thus $\frac{1}{2}P(\sin \varphi \pm 1/x \cos \varphi)=0$, so that $x \sin \varphi = \pm\cos \varphi$, from which it will be seen, that the value of $\varphi$ depends solely on the sign taken and the value of $x$. Thus in this ideal case the value of $\varphi$ is independent of P and in a practical case its dependence on P will be small. If therefore, the amplitude P varies for example because the automatic gain control of the color amplifier 1 does not maintain P satisfactorily constant or because automatic gain control is not employed at all, the angle $\varphi$, created by adjustment of the hue control, remains substantially constant, in contrast with known circuits where the term $\pm\frac{1}{2}xP \cos \varphi$ is replaced by an adjustable D.C. voltage which does not vary with P.

A further advantage of using, in accordance with the invention, the output voltage of the second demodulator 34 for hue control is that, when the synchronizing circuit proper, formed by the first synchronous demodulator 6, the comparison stage 12 and the reactance circuit 27, is out of synchronization, the term $\frac{1}{2}P \cos \varphi$ becomes zero. This means that in the out-of-synchronization state the negative voltage supplied via the resistor 43 disappears, so that irrespective of the position of the variable tapping 42 the negative bias voltage for the comparison stage 12 will disappear. Thus the comparison stage 12 is again adjusted symmetrically as well as possible so that the catching range of the overall synchronizing circuit is again substantially symmetrical to the zero value. In other words, the catching range of the synchronizing circuit is again at a maximum and it will not be affected by the position of the variable tapping 42.

Therefore, the disadvantage otherwise involved in the use of a hue control varying the phase angle $\varphi$ is now obviated.

It should be noted that the presence of the terms $\frac{1}{2}P \sin \varphi$ and $-\frac{1}{2}P \cos \varphi$ in the output signals of the demodulators 6 and 23 does not affect the reproduced signal, since the beams emitted by the three guns of the display tube are cut off during the back porches.

It should also be noted that it is not strictly necessary to feed the negative fly-back pulses 30 to the cathodes of the triodes 13 and 14, if care is taken that these triodes receive the required supply voltage in a different way.

The triodes 13 and 14 need not be valves; they may be diodes, as in the comparison stage 44, or transistors.

In the comparison stages described with reference to FIG. 1 one switching element, either one of the triodes 13 or 14 or one of the diodes 45 or 46, is rendered conducting either during the black level (which is present during the horizontal synchronizing pulses, which pulses themselves are, however, filtered out) or during the burst signal by means of keying pulses in order to fix the value of the signal occurring during the deblocking of a switching element.

The use of only one switching element each time has various disadvantages. Firstly, a non-symmetric arrangement is obtained, which is likely to give rise to disturbances of the output signal and secondly, the keying pulses, which have to render said elements conducting, may have a value during the black level differing from the value during the occurrence of the burst signal. In the embodiment shown in FIG. 1 these pulses are derived from the circuit 19, which is tuned to the second harmonic of the horizontal fly-back frequency, and which is allowed to die out freely during said fly-back time. However, every circuit has a certain amount of damping, so that the sinusoidal keying signal must always have a slightly smaller amplitude during the second half of a period than during the first half. The element conducting during the first half must, however, in the absence of the signal, supply the same direct voltage as the element rendered conducting during the second half, so that the two direct voltages compensate each other and the output signal does not contain a direct voltage. By an asymmetric adjustment of the comparison stage this condition can be fulfilled, but this results in that disturbances are likely to penetrate into the output signal.

In order to obviate this disadvantage the comparison stages described with reference to FIG. 1 have been improved.

Figure 2:
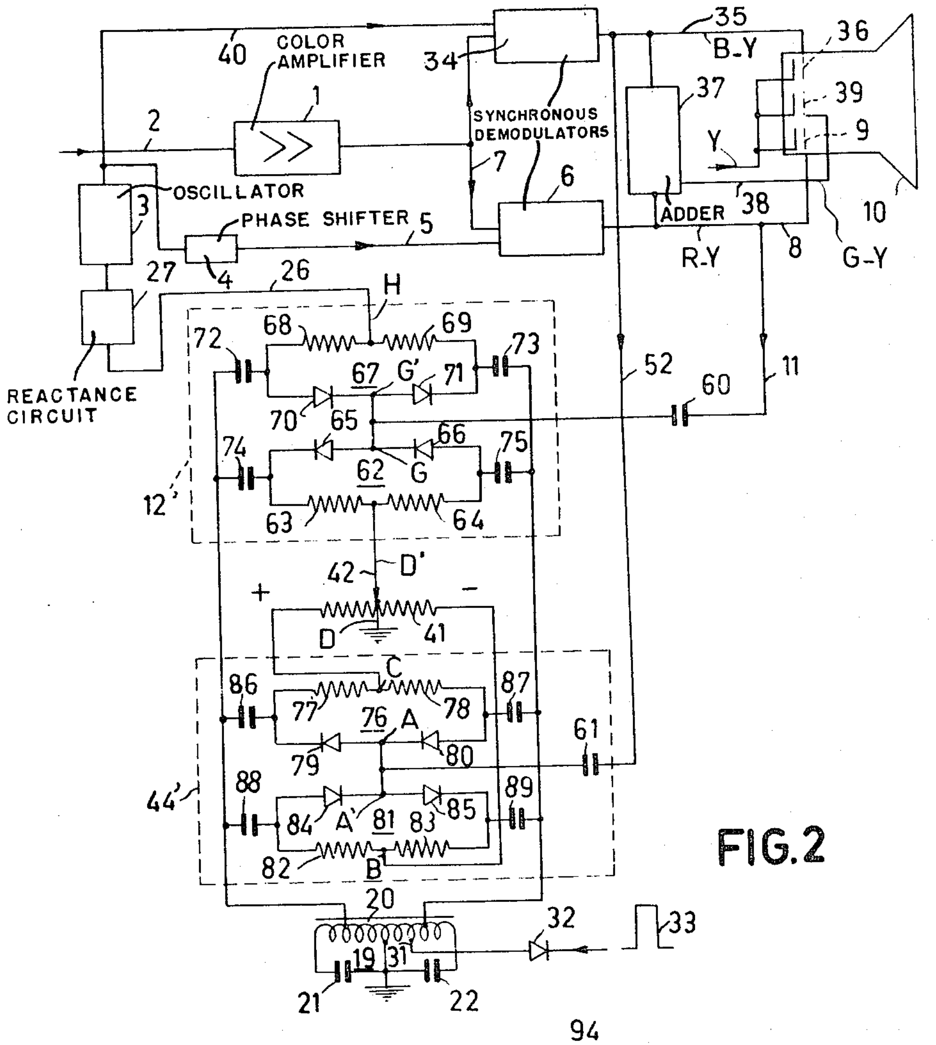
FIG. 2 shows a second embodiment with improved comparison stages.

In FIG. 2, in which corresponding parts are designated as far as possible similarly to those of FIG. 1, reference numeral 12' designates the first comparison stage, to which the signal derived from the first synchronous demodulator 6, supplying the red color difference signal $R-Y$, is fed via the conductor 11 and the capacitor 60 of for example 1500 pf. To the second comparison stage 44' is fed the signal derived from the second synchronous demodulator 34, supplying the blue color difference signal $B-Y$, via the conductor 52 and the capacitor 61 of for example 1500 pf.

Each comparison stage comprises two bridge circuits; the first comparison stage 12' comprises a first bridge circuit 62 consisting of identical resistors 63 and 64 and diodes 65 and 66 and a second bridge circuit 67 consisting of identical resistors 68 and 69 and diodes 70 and 71. To these bridge circuits are fed the keying pulses obtained from the circuit 19 via four capacitors 72 and 73 of for example 680 pf. each and 74 and 75 of for example 10,000 pf. each. From these examples it is evident that the capacitors 74 and 75 are greater than the capacitor 60, the latter being greater than the capacitors 72 and 73.

The second comparison stage 44' comprises two bridge circuits, a first bridge circuit 76 consisting of identical resistors 77 and 78 and diodes 79 and 80 and a second bridge circuit 81 consisting of identical resistors 82 and 83 and diodes 84 and 85. To this comparison stage are also fed keying pulses obtained from the circuit 19 via four capacitors 86 and 87 of for example 10,000 pf. each and 88 and 89 of for example 680 pf. It will be evident that the capacitors 86 and 87 exceed the capacitor 61, which in turn exceeds the capacitors 88 and 89.

To the second comparison stage 44' is added a potentiometer 41, the central tapping D of which is grounded and the two ends of which are connected to the points B and C, which form diagonal points of the two bridge circuits 76 and 81.

The variable tapping 42 of the potentiometer 41 is connected to the junction D' of the resistors 63 and 64 of the first bridge circuit 62.

For a good understanding of the operation of the improved comparison stages, the operation of the second comparison stage 44' will first be described, and then that of the first comparison stage 12' will be described, since, as is described with reference to FIG. 1, the output voltage of the second comparison stage is to be used as a bias voltage for the first comparison stage in order to adjust, by displacing the variable tapping 42, the desired hue correction of the color signal to be reproduced.

The operation of the second comparison stage 44' will be described with reference to FIG. 3, in which the second comparison stage 44' is shown separately together with the control-voltage sources 90 and 91, which replace the circuit 19.

As stated above the circuit 19 is capable of dying out freely during the horizontal fly-back time.

Figure 3:
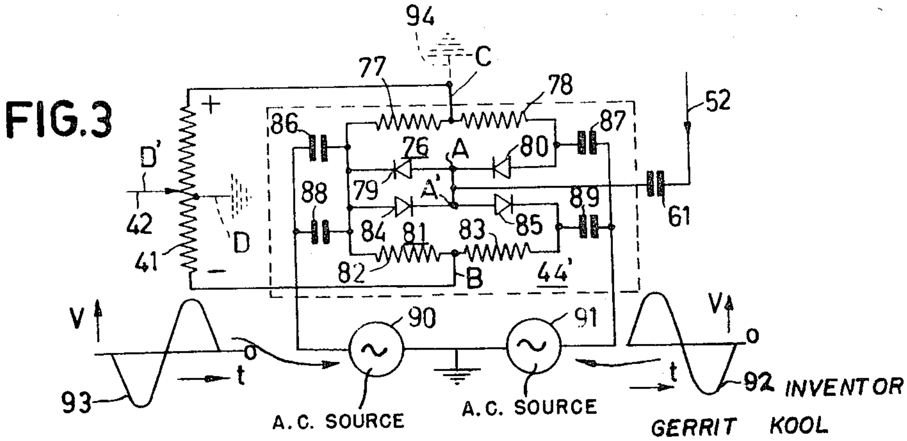
FIG. 3 shows a detail of the arrangement shown in FIG. 2.

Since the circuit 19 is tuned to the second harmonic of the horizontal fly-back frequency and the tapping 31 of FIG. 2 is arranged on the right-hand part of the inductor 20, the right-hand part of the circuit 19, which is represented in FIG. 3 by the source 91, supplies a sinusoidal oscillation, indicated at 92 in FIG. 3, whereas the left-hand part of the circuit 19, represented by the source 90 in FIG. 3, supplies a sinusoidal signal indicated at 93 in FIG. 3.

The signal 92 has positive polarity during the first half of the horizontal fly-back time and negative polarity during the second half of said fly-back time, the signal 93 having just the opposite polarities. The signal 92, which is fed via the capacitor 87 to the diode 80, will be capable of rendering the diode 80 conducting during the first half of the horizontal fly-back time, whereas at the same time the signal 93, which is supplied via the capacitor 86 to the diode 79, will render the diode 79 conducting. This means that the diodes 79 and 80, which operate as circuit elements, will be conducting simultaneously during the first half of the horizontal fly-back time, due to the signals 92 and 93, so that the diagonal point A of the first bridge circuit 76 will be at the same potential as the diagonally opposite point C of the same bridge circuit. In the first place it is assumed in FIG. 3 that the point C is connected to ground, which is indicated by the broken curve 94 in FIG. 2. This means that the point A is also at ground potential during the first half of the horizontal fly-back time irrespective of the amount of conductivity of the diodes 80 and 79, since in a bridge circuit the diagonally opposite points are always at the same potential, when this bridge circuit is controlled at the other diagonal points, in this case the points connected to the capacitors 86 and 87, from a different voltage source, i.e., the sources 90 and 91. Since the signal supplied via the conductor 52 will contain information about the black level during the first half of the horizontal fly-back time, the conduction of the first bridge circuit 76 for the first half of the horizontal fly-back time puts the black level at point A at ground potential.

In a similar manner as described for the bridge circuit 76, the second bridge circuit 81 is keyed during the second half of the horizontal fly-back time by the signals 92 and 93, which render the diodes 84 and 85 simultaneously conducting, so that during the second half of the horizontal fly-back time the diagonal point B of the second bridge circuit 81 is at the same potential as the diagonally opposite point A', which is connected not only to the point A of the first bridge circuit 76 but also via the capacitor 61 to the conductor 52. The capacitor 61 thus operates as a storage element for the second comparison stage 44'. This means that during the first half of the horizontal fly-back time the plate of the capacitor 61, which is connected to the points A and A', is brought at ground potential and the charge thus produced will be held on this capacitor plate.

The fact that the capacitor 61 obtains the major part of the charge and the capacitors 86 and 87 obtain the smaller portion can be accounted for as follows. When the diodes 79 and 80 are opened, the current will flow via the capacitor 61, the diodes 79 and 80, the capacitors 86 and 87 and the sources 90 and 91 to ground and from ground via the source connected to the conductor 52 back to the capacitor 61. Since the capacitor 61 is smaller than the capacitors 86 and 87, it will receive at each opening of the diodes 79 and 80 more charge than the capacitors 86 and 87. At each release the charge of the capacitor 61 further increases and, in fact, that of the capacitors 86 and 87 decreases, so that after a few periods the capacitor 61 will have substantially the whole charge. As stated above, this amount of charge and hence the potential at point A is determined by the potential at point C.

The signal supplied via the conductor 52 is derived from the second synchronous demodulator 34, which supplies a signal as indicated by the Equation 5. From the Equation 5 it appears that this signal contains, during the horizontal fly-back time, a term $-\frac{1}{2}P\cos\varphi$, which represents a negative voltage which is proportional to the angle $\phi$, i.e., the phase angle between the subcarrier signal supplied by the oscillator 3 and the burst signal. Since the diodes 84 and 85 are opened during the second half of the horizontal fly-back time, during which the term $-\frac{1}{2}P\cos\varphi$ prevails, the capacitors 88 and 89 are charged to a value which is substantially proportional to said term $$-\frac{1}{2}P\cos\varphi$$

This can be accounted for as follows. As stated above the capacitor 61 obtains during the first half of the line fly-back time due to the diodes 79 and 80 rendered conducting, a charge which cause the points A and A' to assume the potential of point C. When the diodes 84 and 85 are conducting, the current can flow via the capacitor 61, the diodes 84 and 85 the capacitors 88 and 89 and the sources 90 and 91 to ground and from ground via the source connected to the conductor 52 back to the capacitor 61. The capacitor 61 already had a given charge, so that the current flowing will be determined by said charge already prevailing at capacitor 61 and the voltage of the source connected to the conductor 52, which voltage is given by $-\frac{1}{2}P\cos\varphi$. Since the capacitor 61 is greater than the capacitors 88 and 89, the latter capacitors obtain slightly more charge than the capacitor 61 when the diodes 84 and 85 are opened. At each instant of conductivity the charge of the capacitors 88 and 89 increases further and, in fact, that of the capacitor 61 decreases, so that after a few periods the capacitors 88 and 89 have the whole charge. Since the initial charge of the capacitor 61 corresponds to the potential at point C, which is assumed to be at ground potential, the charge of the capacitors 88 and 89 is substantially proportional to the term $$-\frac{1}{2}P\cos\varphi$$

This is the direct voltage component of negative polarity which is operative across the conductor 52, so that the diode 84 is rendered more conducting than the diode 85. The capacitor 88 is therefore charged to a higher voltage than the capacitor 89 and the difference will be just proportional to the value of $-\frac{1}{2}P\cos\varphi$. This difference can be derived from point B.

In fact the capacitor 61 will not obtain first the whole charge and then transfer it to the capacitors 88 and 89, but the transfer will take place gradually; each time a small amount will be transferred first to 61, then from 61 to 88 and 89 until finally the latter have taken the desired charge corresponding to the value of $-\frac{1}{2}P\cos\varphi$. The result is therefore that point B is at negative potential to ground.

In fact, point C is not connected to ground but point D is ground-connected, which is the central tapping of the potentiometer 41. This is connected between the points B and C. Since the point B, as stated above, is at negative potential to point C, this only means that a potential is produced across the potentiometer 41, while the end of the potentiometer connected to point B is at a negative potential to the end thereof connected to point C. When the central tapping of the potentiometer 41, i.e., point D, is connected to ground, it follows therefrom that point C will be positive and point B negative with respect to ground.

When the tapping 42, which is connected to point D′ of the first bridge circuit 62 of the first comparison stage 12′, is just opposite the tapping D of the potentiometer 41, the point D′ will also be at ground potential. The operation of the first comparison stage 12′ is similar to the operation of the second comparison stage 44′, since via the capacitors 74 and 75 the diodes 65 and 66 of the first bridge circuit 62 obtain the signal 92 and 93 from the circuit 19. Consequently, the diodes 65 and 66 will be rendered conducting simultaneously during the first half of the horizontal fly-back time and the diagonal point G of the first bridge circuit 62 is at the same potential as the diagonal point D′, which is assumed to be at ground potential. Consequently, also in this case during the first half of the horizontal fly-back time the black level in the signal supplied by the conductor 11 is at ground potential. The points G and G′ are interconnected and since the second bridge circuit 67 is rendered conducting by the signals supplied via the capacitors 72 and 73 during the second half of the horizontal fly-back time, the diagonal point H will assume the same potential as the diagonal point G′ for the second half of the horizontal fly-back time.

The conductor 11 is connected to the output terminal of the first synchronous demodulator 6, which supplies a signal as indicated by the Equation 4. For the second half of the horizontal fly-back time the demodulator 6 supplies a signal proportional to the term $\frac{1}{2}P \sin \varphi$. In the same manner as described for the comparison stage 44′ it can be proved that the capacitor 60 takes substantially the whole charge when the diodes 65 and 66 are rendered conducting. Since the capacitors 74 and 75 are large with respect to capacitor 60; said charge is determined by the potential at point D′, so that the points G and G′ will also assume this potential. Since the capacitor 60 is large relative to capacitors 72 and 73, the latter will obtain the major portion of the charge like the capacitors 88 and 89. The capacitors 72 and 73 are, however, charged to a value which is proportional to the term $\frac{1}{2}P \sin \varphi$. If therefore $\varphi$ is positive, the point H becomes positive, but if $\varphi$ is negative point H becomes negative relative to point D′. The control-voltage obtained from point H is supplied via the conductor 26 to a reactance circuit 27 for the frequency adjustment of the local oscillator 3.

In the foregoing it is assumed that the tapping 42 is just opposite the tapping D, so that the points D and D′ have the same potential, i.e., ground potential. However, when the variable tapping 42 of FIG. 2 is displaced to the left, the point D′ will assume positive potential so that the value of the voltage at point H will be equal to the sum of the voltages prevailing at point D′ and the voltage proportional to the term $\frac{1}{2}P \sin \varphi$, supplied via the capacitor 60 to the comparison stage 12′. However, when the tapping 42 of FIG. 2 is displaced to the right, the point D′ is at the negative potential and accordingly the voltage at point H will be reduced by a negative amount.

Thus, as described with reference to FIG. 1, it is possible to adjust the desired hue of color signal to be reproduced, since a control-voltage is derived from point H which is proportional to $\frac{1}{2}P \sin \varphi$ to which is added, in accordance with the position of the tapping 42, a positive or a negative voltage which affects the phase angle $\varphi$ and hence the color to be reproduced.

However, if an asynchronous state occurs, the voltage of the potentiometer 41 will fall off, and hence also any adjusted bias voltage of the point D′, so that with the aid of the beat signal which is then produced at point H, so that the catching function of the arrangement is quite symmetrical.

It should be noted that although in the foregoing there are described bridge circuits 62, 67, 76 and 81 each comprising two diodes as circuit elements and two resistors as associated parts of the bridge circuit, said resistors, fo example resistors 63 and 64 of the first bridge circuit 6 may be replaced by diodes, so that the bridge circui can be rendered conducting in an improved manne This is, however, not necessary.

It should furthermore be noted that the diodes as em ployed as circuit elements in these bridge circuits ma be replaced, if desired, by other circuit elements, for ex It should furthermore be noted that although in th ample triodes or transistors.

foregoing it is stated that in the network 4 the phase o the regenerated subcarrier signal is shifted through 90° so that the first synchronous demodulator 6 demodulate in a direction differing by 90° from the direction of de modulation of the second demodulator 34, this is no strictly necessary. Demodulation may be performed i two directions differing less than 90° from each othe and the ouput signals of the two demodulators may b added in a matrix circuit so that practically the re ($R-Y$), the blue ($B-Y$) and the green ($G-Y$) colo difference signals are produced. The red color differenc signal ($R-Y$) at the output of the matrix circuit is the identical to the output signal of the first synchronous de modulator 6 in the embodiment shown in FIGS. 1 and 2 This output of the matrix circuit can thus be connecte to the input of the first comparison stage 12 or 12′ i order to obtain the same control signal as in the case shown in FIGS. 1 and 2.

In a similar manner it can be proved that, when the input of the second comparison stage 44 or 44′ is connected to that output of the matrix circuit from which the blue color difference signal ($B-Y$) is derived the output voltage of the stage 44 or 44′ will be the same as in the embodiment shown in FIGS. 1 or 2. When use is made of two demodulators and a matrix circuit, we are therefore concerned with the signal finally obtained subsequent to demodulation.

Finally it should be noted that in the foregoing a signal received in accordance with the N.T.S.C.-system is taken as a basis, in which system the phase of the transmitted subcarrier has a phase difference of 180° as compared with the phase with which the $B-Y$ signal is modulated on the subcarrier. However, the idea of the invention may also be applied to the case in which the transmitted subcarrier is in phase or in phase opposition relative to the $R-Y$ signal. In the latter case the signal for the comparison stage 12 or 12′ must be derived from the $B-Y$ demodulator. It is furthermore possible to use the arrangement according to the invention, when the phase of the transmitted subcarrier signal is at an arbitrary angle to the so-called $B-Y$ or $R-Y$ direction. In this case the demodulator 6 must demodulate in a direction differing by 90° from the phase in which the subcarrier is transmitted. The demodulator 34 must demodulate in a direction differing by 90° from the direction in which the first demodulator demodulates. With the aid of a matrix circuit the desired color signals must be derived from the signals obtained from the two demodulators 6 and 34.

What is claimed is:

1. In a color television receiver for receiving color television signals of the type in which two color signals are modulated in quadrature on a subcarrier wave, and synchronizing signals are provided between scanning lines, and wherein said synchronizing signals include subcarrier oscillations and have a black level, means for demodulating said television signals comprising first and second synchronous demodulator means, reference oscillator means for providing reference oscillations, means for applying said reference oscillations and television signals to said first and second synchronous demodulator means whereby the reference oscillations applied to said first synchronous demodulator means are in quadrature with the reference oscillations applied to said second synchronous demodulator means, means connected to said reference illator means for controlling the phase of said refere oscillations, comparator means, comprising first and ond unilaterally conductive devices having control ctrodes and output electrodes, a source of gating sigs connected to said comparator means for rendering l comparator operative only during the time between nning lines, means for applying the output of said first nodulator means to said comparator means for coming the amplitude of the output signals of said first dedulator means during the occurrence of said subcarrier illations with the level of said black level to provide ontrol voltage, means for applying said control voltage said means for controlling the phase of said reference illations, means for applying the output signals of said t demodulator means to said control electrodes of said ilaterally conductive device, an oscillatory circut concted between said output electrodes, said oscillatory cirit having a frequency that is a harmonic of the line back frequency of said television signals, means for mping said oscillatory circuit except during the time been scanning lines, and means connected to at least one said output electrodes for providing said control volte.

2. The receiver of claim 1, in which said unilaterally nductive devices are electron discharge devices, and id output electrodes and control electrodes are anodes d control grids respectively of said devices, comprising eans for applying said gating signals to the cathodes of id devices.

3. In a color television receiver for receiving color levision signals of the type in which two color signals e modulated in quadrature on a subcarrier wave, and nchronizing signals are provided between scanning ies, and wherein said synchronizing signals include subrrier oscillations and have a black level, means for deodulating said television signals comprising first and cond synchronous demodulator means, reference oscilltor means for providing reference oscillations, means for plying said reference oscillations and television signals said first and second synchronous demodulator means hereby the reference oscillations applied to said first nchronous demodulator means are in quadrature with e reference oscillations applied to said second synchroous demodulator means, means connected to said referice oscillator means for controlling the phase of said ference oscillations, first and second comparator means, source of gating signals connected to said first and second comparator means for rendering said first and second omparator means operative only during the time between canning lines, means applying the output of said first synhronous demodulator means to said first comparator neans for comparing the amplitude of the output signals f said first comparator means during the occurrence of aid subcarrier oscillations with the level of said black evel to provide a control voltage, means for applying aid control voltage to said means for controlling the hase of said reference oscillations, means for applying he output of said second synchronous demodulator means o said second comparator means for providing a bias voltge proportional to the amplitude of the signal output of aid second demodulator means during the occurence of aid subcarrier oscillations, adjustable means for adding aid bias voltage to said control voltage for controlling the ue of a televised image, and means for deriving color mage signals from said first and second demodulator neans.

4. The receiver of claim 3 in which said first comparator means comprises first and second bridge circuits, said source of gating signals comprising means producing an oscillation during the line flyback time that has a frequency of twice the line flyback frequency, means applying said gating signals between a first pair of opposite terminals of each of said first and second bridge circuits, at least two adjacent arms of each of said first and second bridge circuits between the respective first pair of terminals comprising unilateral conducting means, whereby current flows in said two arms of said bridge circuit only during the first half of the line flyback time and current flows in said two arms of said second bridge circuit only during the second half of said line flyback time, means applying the output of said first synchronous demodulator means to one remaining terminal of each of said first and second bridge circuits, means connecting the other remaining terminal of one of said bridge circuits to said second comparator means, and means connecting the other remaining terminal of the other said bridge circuit to said phase controlling means.

5. The receiver of claim 3 in which said second comparator means comprises first and second bridge circuits, said source of gating signals comprising means producing an oscillation during the line flyback time that has a frequency of twice the line flyback frequency, means applying said gating signals between a first pair of opposite terminals of each of said first and second bridge circuits, at least two adjacent arms of each of said first and second bridge circuits between the respective first pair of terminals comprising unilateral conducting means, whereby current flows in said two arms of said first bridge circuit only during the first half of the line flyback time and current flows in said two arms of said second bridge circuit only during the second half of said line flyback time, means applying the output of said second synchronous demodulator means to one remaining terminal of each of said first and second bridge circuits, tapped potentiometer means connected between the remaining terminals of said first and second bridge circuits, means connecting the tap on said potentiometer means to a point of reference potential, and means connecting the adjustable arm of said potentiometer means, to said first comparator circuit means.

6. The receiver of claim 3, in which said first comparator means comprises first and second unilaterally conductive devices having control electrodes and output electrodes, comprising means for applying the output signals of said first demodulator means to said control electrodes, an oscillatory circuit connected between said output electrodes, said oscillatory circuit having a frequency that is a harmonic of the line flyback frequency of said television signals, means for damping said oscillatory circuit except during the time between scanning lines, means connected to at least one of said output electrodes for producing said control voltage, said second comparator means comprises third and fourth unilaterally conductive devices, and means connecting said third and fourth unilaterally conductive devices to said oscillatory circuit.

7. The receiver of claim 6, wherein said adjustable means comprises resistor means connected between the control electrodes of said first and second devices, a fixed tap on said resistor means connected to a point of reference potential, and a variable tap on said resistor means connected to said second comparator means.

8. In a color television carrier, a source of color television signals of the form:

$$\alpha(R-Y)\cos\omega t+\beta(B-Y)\sin\omega t-P\sin\omega t$$

wherein $R-Y$ and $B-Y$ are color difference signals, $\omega$ is the angular frequency of a subcarrier wave, $\alpha$ and $\beta$ are constants, and the term $-P\sin\omega t$ is a subcarrier oscillation occurring only during part of the flyback time, a source of first and second reference oscillations of the form $\cos(\omega t+\varphi)$ and $\sin(\omega t+\varphi)$ respectively, wherein $\varphi$ is the phase angle between said reference oscillations and subcarrier wave, first and second synchronous demodulators, means applying said first reference oscillation and television signals to said first synchronous demodulator means whereby a signal of the form $P/2\sin\varphi$ occurs during said flyback time, means applying said second reference oscillation and television signals to said second synchronous demodulator means whereby a signal of the form $P/2 \cos \varphi$ occurs during said flyback time, means deriving said color difference signals from said first and second synchronous demodulator means, means for controlling the phase of said reference oscillations, means for producing a control voltage connected to said controlling means, said means for producing a control voltage comprising comparator means connected to the output of said first synchronous demodulator means for providing a control voltage proportional to the amplitude of said signal of the form $P/2 \sin \varphi$, second comparator means connected to said second synchronous demodulator means for providing a bias voltage proportional to the amplitude of said signal of the form $P/2 \cos \varphi$, and hue control means comprising adjustable means for adding said bias voltage to said control voltage whereby the value of phase angle $\varphi$ is varied.

9. The receiver of claim 7, in which said first and second comparator means comprise means for comparing the amplitude of the signal outputs of said first and second synchronous demodulator means respectively during the occurrence of said subcarrier oscillations with the black level occurring during the remainder of said flyback time when said subcarrier oscillations are not present.

10. In a color television receiver for receiving color television signals of the type in which two color signals are modulated in quadrature on a subcarrier wave, and synchronizing signals are provided between scanning lines, and wherein said synchronizing signals include subcarrier oscillations and have a black level, means for demodulating said television signals comprising first and second synchronous demodulator means, reference oscillator means for providing reference oscillations, means for applying said reference oscillations and television signals to said first and second synchronous demodulator means whereby the reference oscillations applied to said first synchronous demodulator means are in quadrature with the reference oscillations applied to said second synchronous demodulator means, means connected to said reference oscillator means for controlling the phase of said reference oscillations, first, second, third and fourth clamping bridge circuits, a source of a gating signal oscillation which occurs only during the line flyback time and has a frequency of twice the line flyback frequency, means applying said gating signal between one pair of opposite terminals of each of said bridge circuits, at least two adjacent arms of each of said first, second, third and fourth bridge circuits between the respective first pairs of terminals comprising unilateral conducting means, whereby current flows in said two arms of said first and third bridges only during the first half of the line flyback time and current flows in said two arms of said second and fourth bridge circuits only during the second half of said line flyback time, means applying the output of said first demodulator means to one remaining terminal of each of said first and second bridge circuits, means applying the output of said second demodulator means to one remaining terminal of each of said third and fourth bridge circuits, means for adding an adjustable portion of the voltage between the other remaining terminals of said third and fourth bridge circuits to the voltage between the other remaining terminals of said first and second bridge circuits, and means applying said adder voltages to said phase controlling means.

11. The receiver as claimed in claim 10, in which the said other remaining terminals of said third and fourth bridge circuits are connected respectively to the two ends of a potentiometer, said potentiometer having a central tapping connected to a point of reference potential and a variable tapping connected to the other remaining terminal of one of said first and second bridge circuits, and means connecting the other remaining terminal of the other of said first and second bridge circuits to said phase controlling means.

12. The receiver as claimed in claim 10, which comprises two LC circuits, for obtaining said gating oscillations, said LC circuits being each tuned to the second harmonic of the horizontal flyback frequency, the inductances of said LC circuits being intercoupled magnetically, a diode connected to a tap of the inductance of one of the two LC circuits, means for rendering said diode conductive by line flyback pulses during the horizontal stroke and for blocking said diode during the horizontal flyback time, one said LC circuit being connected between a point of reference potential and said second, fourth, sixth and eighth capacitors, the other LC circuit being connected between said point of reference potential and said third, fifth, seventh and ninth capacitors, said two arms of each of said first, second, third and fourth bridge circuits being serially connected between said pair of terminals of the respective bridge circuit.

13. The receiver as claimed in claim 12 in which the pass direction of two series-connected arms of each of said first, second, third and fourth bridge circuits is the same but in that the pass direction of said two arms of the first and the third bridge circuits is opposite that of said arms of the second and fourth bridge circuits.

14. The receiver of claim 10 comprising a first capacitor for applying the output of said first demodulator means, to said one remaining terminals of said first and second bridge circuits, second and third capacitors for connecting said source to said first bridge circuit, fourth and fifth capacitors for connecting said source to said second bridge circuit, sixth and seventh capacitors for connecting said source to said third bridge circuit, eighth and ninth capacitors for connecting said source to said fourth bridge circuit, and a tenth capacitor for applying the output of said second demodulator means to said one remaining terminals of said third and fourth bridge circuits.

15. The receiver of claim 14 in which the capacitance of the second capacitor and of the third capacitor is high as compared with that of the first capacitor, and the capacitance of the first capacitor is high as compared with that of the fourth capacitor and of the fifth capacitor.

16. The receiver of claim 14 in which the capacitance of said sixth and seventh capacitors is high as compared to that of said tenth capacitor, and the capacitance of said tenth capacitor is high as compared with that of said eighth and ninth capacitors.

References Cited by the Examiner

UNITED STATES PATENTS

| | | | |
|---|---|---|---|
| 2,766,321 | 10/1956 | Parker | 178—5.4 |
| 2,896,078 | 7/1959 | Moore | 178—5.4 |
| 3,030,436 | 4/1962 | Schroeder | 178—5.4 |
| 3,148,243 | 9/1964 | Wiencek | 178—5.4 |

DAVID G. REDINBAUGH, *Primary Examiner.*

J. A. O'BRIEN, *Assistant Examiner.*

UNITED STATES PATENT OFFICE

CERTIFICATE OF CORRECTION

Patent No. 3,294,900 December 27, 1966

Gerrit Kool

It is hereby certified that error appears in the above numbered patent requiring correction and that the said Letters Patent should read as corrected below.

Column 5, line 63, for "23" read -- 34 --; column 10, line 8, beginning with "be replaced" strike out all to and including "or transistors." in line 10, same column 10, and insert instead the following:

be replaced, if desired, by other circuit elements, for example triodes or transistors.
It should furthermore be noted that although in the Signed and sealed this 28th day of November 1967.

(SEAL)
Attest:

EDWARD M.FLETCHER,JR.
Attesting Officer

EDWARD J. BRENNER
Commissioner of Patent